United States Patent [19]

Niederprüm et al.

[11] 4,055,458

[45] Oct. 25, 1977

[54] ETCHING GLASS WITH HF AND FLUORINE-CONTAINING SURFACTANT

[75] Inventors: Hans Niederprüm, Monheim; Heinz Günter Klein, Cologne; Johann-Nikolaus Meussdoerffer, Blecher, all of Germany

[73] Assignee: Bayer Aktiengesellschaft, Leverkusen, Germany

[21] Appl. No.: 709,995

[22] Filed: July 30, 1976

[30] Foreign Application Priority Data

Aug. 7, 1975 Germany .............................. 2535333
Dec. 15, 1975 Germany .............................. 2556429

[51] Int. Cl.² ........................ C03C 15/00; C03C 25/06
[52] U.S. Cl. .................................... 156/663; 156/903; 252/79.3; 252/79.4
[58] Field of Search ................... 156/15, 24, 25, 663, 156/903; 252/79.3, 79.4; 134/3; 65/31

[56] References Cited

U.S. PATENT DOCUMENTS 2,118,386  5/1938  Swinehart .......................... 252/79.3
3,383,255  5/1968  Rossi et al. ....................... 252/79.4 X Primary Examiner—William A. Powell
Attorney, Agent, or Firm—Burgess, Dinklage & Sprung

[57] ABSTRACT

In the etching of glass wherein glass is contacted with an aqueous etching bath containing hydrofluoric acid, and the glass is thereafter removed from the bath and rinsed, the improvement which comprises dissolving in the etching bath an acid-resistant wetting agent. Preferably the wetting agent contains fluorine, e.g. a perfluoralkane sulfonic acid quaternary ammonium salt, a perfluoralkane carboxylic acid salt, an alkoxylation product of a perfluoralkane sulfonamide, or the like.

3 Claims, No Drawings

ETCHING GLASS WITH HF AND FLUORINE-CONTAINING SURFACTANT

This invention relates to an improved process for etching, more especially acid polishing and mat etching, glass articles in the presence of fluorine-containing surfactants, the liquid required for this purpose, which contains hydrogen fluoride and which may additionally contain sulphuric acid and/or inorganic fluorides, as $NH_4F \cdot HF$ having added to it a water-soluble and acid soluble wetting agent stable therein, more especially a fluorine-containing surfactant.

The acid polishing of glass, especially lead crystal glass, is normally carried out with heated, aqueous solutions of hydrofluoric acid and sulfuric acid in widemesh, acid-resistant baskets of plastic materials or copper. The glass surfaces which have become opaque as a result of grinding are made transparent again and brought to a high luster by virtue of the fact that the glass itself, which contains silicon dioxide, is attacked at its surface and the silicon component is converted into volatile or soluble $SiF_4$, or $H_2SiF_6$. The acid polishing process is governed by a number of parameters, for example the composition of the bath, the dip time, the dipping technique and the temperature, these factors having to be adapted to the individual types of glass, for example pressed glass, ground glass, colored glasses, etc. The dipping process is generally repeated several times, and the glass articles are freed from adhering solids, for example calcium and lead sulfates or fluorides, in a subsequent water bath or sulfuric acid bath. Finally, the glass articles are rinsed in a water bath (cf. L. Springer, Sprechsaal fur Keramik-Glas-Email, 87 (1954), page 244).

By contrast, the mat etching of glass, especially plate glass, it normally carried out by treating the surface of the glass with hydrofluoric acid vapor or with etching liquids containing hydrofluoric acid. In a following operation, the surfaces are washed free from acid and dried. The $SiF_4$ or $H_2SiF_6$ formed during reaction of the glass with the hydrofluoric acid is removed with lime from the gases given off and from the water used for washing.

The etching process is governed by a number of parameters, for example by the composition of the etching liquid, the reaction temperature, the reaction time, the method by which the etching liquid is applied, the rinsing and drying process, the surface quality of the glass and not least by the composition of the glass, all of which have to be adapted to one another. In some cases, the etching process is even repeated to obtain uniform etching.

The composition of the acid polishing bath is generally 40 to 70% of sulfuric acid and 2 to 15 % of hydrofluoric acid, the rest being water. The temperature is in the range of from 40° to 70° C. In the case of lead-free glasses, even higher concentrations of hydrofluoric acid are used.

The hydrofluoric acid employed for mat etching is used in a concentration range of from 20 to 100% by weight. Other substances, for example acid fluorides, especially ammonium hydrogen fluoride, may be added in concentrations of from 0 to 70% weight. The rest of the etching liquid consists of water.

Unfortunately, the processes described above are attended by a few significant disadvantages from the practical point of view. Thus, when the polishing bath or etching liquid is heated to 40°–70° C, the hydrogen fluoride is volatilized to a considerable extent. Apart from the loss of the actual etching agent, the vapor containing hydrofluoric acid has to be completely eliminated for physiological reasons without polluting the environment, for example by means of extraction systems, or by absorption in water or alkali solutions and neutralization with lime.

Attempts have been made to obviate this disadvantage by recycling through an acid recovery unit, for example DOS No. 2,343,256.

Another disadvantage of some conventional processes are the long etching times and the need for etching to be repeated. However, any further increase in the etching temperature and, hence, in the reaction velocity must be ruled out on account of the increased losses of hydrogen fluoride which would inevitably be involved. Any increase in the concentration of the hydrogen fluoride in the etching solution inevitably increases the danger of uneven etching (overetching), so that it is best not to make any changes in the etching liquid.

The suspended solids formed during the polishing process often adhere persistently to the surface of the glass, especially to any depressions therein, and lead undesirably to the formation of mat zones on the glass. Although repeated interruption of the polishing process by vigorously flushing off the solid particles in the subsequent washing bath reduces these faults, it involves considerable losses of the polishing liquid through entrainment, in addition to which the polishing liquid becomes diluted with water. Accordingly, it has also been proposed in DAS No. 1,496,654 to improve the polishing process by means of ultrasonics, although this involves the use of expensive apparatus which is soon affected by the corrosive atmosphere. According to another proposal in DOS No. 2,011,964, the acid polishing bath is continuously cleaned during the polishing process. For example, the solids are separated off by means of acid-resistant centrifuges. Unfortunately, all these processes have certain disadvantages so that they have never been successfully adopted for acid polishing.

Another disadvantage of the conventional acid polishing process and often a reason for rejected articles is that persistent acid residues adhere to the surface of the glass where it is in contact with the basket and can lead to overetching and faults in the finish.

Since, in the mat etching of industrial glass on a massproduction scale, adhering particles of dirt (dust, oil films and the like) cannot always be completely removed from the surfaces beforehand simply by washing with water, attempts have already been made to add conventional cleaning agents, soap solutions and the like to the washing water for cleaning the surfaces of these types of glass.

Unfortunately, this generally requires a separate, additional cleaning step which only serves to complicate the process.

Accordingly, the object of the present invention is to provide a simple process for etching glass, more especially for the acid polishing of ground glass articles and for the mat etching of glass, especially plate glass, by means of etching liquids containing hydrogen fluoride, distinguished by the fact that the etching liquid has added to it a soluble wetting agent which is stable therein.

It has surprisingly been found that, by adding a wetting agent which is stable inter alia in hydrogen fluoride, even in very low concentrations, the disadvantages and difficulties referred to above may be eliminated or at least considerably alleviated.

Suitable acid-resistant water-soluble wetting agents are described in U.S. Pat. No. 2,148,432, for example, sulfonates with the structure:

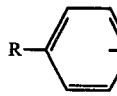—O—(CH$_2$)$_x$—(O—CH$_2$—CH$_2$)$_y$—SO$_3$Na, in which
R represents an alkyl radical, preferably of 1 to 10 carbon atoms,
x and y are integers from 0 to 30, and $x + y$ is from 1 to 60.

Fluorine-containing surfactants are particularly suitable for use in the process according to the invention because, by virtue of their chemical inertness, they are totally stable in the etching baths at the reaction temperatures, and by virtue of their extreme surface-active properties need only be used in minimal quantites, for example in quantities of from about 10 to 500 mg/liter and preferably in quantities of about 50 to 300 mg/liter of etching liquid. The surface tension of the etching liquids may even be reduced to values below 20 dyn/cm, so that even the surfaces of different types of glass may be uniformly wetted.

Fluorine-containing surfactants of the kind in question are known per se and are commercially available. From the chemical point of view, they are characterized by the fact that they contain a perfluorinated linear or branched carbon radical R$_F^2$ with from 6 to 20 carbon atoms and preferably with from 6 to 12 carbon atoms, and also a corresponding functional radical which determines whether the wetting agent is anion-active, cation-active or non-ionic and which influences solubility, for example in water and acids (cf. O. Scherer in Fortschritte der chem. Forschung 14, (1970) 2, 212 and O. Lichtenberger in Chim. et Ind. 104 (1971) 7, 815, also M. Woodfine in Chimie et Ind. 101 (1969) 895). Examples are perfluoroalkane sulfonic acids and carboxylic acids, for example C$_8$F$_{17}$SO$_3$H or C$_6$F$_{13}$CH$_2$CH$_2$SO$_3$H and C$_7$F$_{15}$COOH, and their salts and other derivatives of these basic components, such as alcohols, amides, phosphoric acid derivatives, polyether compounds and others. Other examples are the telomerization products based on tetrafluorethylene and perfluoropropene, the products in question generally being mixtures of homologous compounds.

According to the invention, it is preferred to use in the etching liquids readily water-soluble and acid-resistant fluorine-containing wetting agents, for example ionic products corresponding to the general formula:

(R$^1$R$^2$R$^3$R$^4$N)$^+$ R$_F$SO$_3^-$ in which
R$^1$, R$^2$, R$^3$ and R$^4$ each independently is alkyl, alkenyl, cycloalkyl or aralkyl of up to 20 carbon atoms, or two or three of R$^1$, R$^2$ and R$^3$ together with the nitrogen atom form a heterocyclic ring, e.g. morpholine, piperidine, pyridine.

Tetramethyl and tetraethyl ammonium perfluoralkane sulfonates are particularly preferred by virtue of their high solubility. Compounds of this class may readily be obtained by reacting perfluoralkane sulfonyl fluorides with tertiary amines and silicic acid esters, as described in DOS No. 1,929,665 and Ann. Chem. 731 (1970) 58.

Another suitable group of non-ionic fluorine-containing wetting agents are the readily soluble alkoxylation products of perfluoralkane sulfonamides corresponding to the general formula:

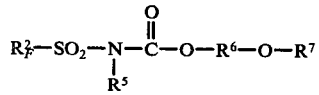

in which
R$_F^2$ represents a perfluoralkyl radical with from 1 to 20 carbon atoms, in which the carbon chain may be linear, branched or cyclic,
R$^5$ represents hydrogen, or alkyl, hydroxyalkyl, cycloalkyl, alkenyl or aralkyl, optionally even substituted of up to 6 carbon atoms, or the radical

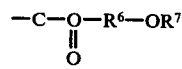

R$^6$ represents a linear or branched aliphatic polyether radical made up of about 5 to 40 units of either the same or different alkylene oxides each of up to 3 carbon atoms, the alkylene oxide units being distributed in alternation, statistically or in blocks, and
R$^7$ represents a linear, branched or cyclic alkyl, alkenyl or aralkyl radical with up to 8 carbon atoms, or the radical

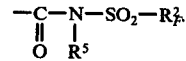

Compounds of this type are produced, for example, in accordance with DOS No. 2,238,740 by reacting perfluoralkyl sulfonamides with chloroformic acid esters of the corresponding hydroxy functional polyethers in the presence of proton acceptors for separating off the hydrogen chloride formed.

The above-mentioned surfactants are generally added in quantities of from about 10 to 1000 mg/liter of etching liquid. In the case of some surfactants, favorable results are even obtained with smaller additions, for example with additions of about 5 to 500 mg.

The effect of adding a soluble wetting agent resistant to hydrochloric acid and sulfuric acid, more especially a fluorine-containing surfactant, to etching and polishing baths for glass is that both the evaporation losses of HF and the etching times and the temperature of the etching bath are reduced. In addition, contact faults are considerably reduced, presumably because the bath liquid drains off better from the baskets by virtue of the significant reduction in surface tension. The number of rejects caused by persistently adhering particles of the etching sludge are also reduced because these particles can be rinsed off more easily. In addition, glasses treated in accordance with the invention also show an improved surface finish (luster, smoothness, feel etc.).

Accordingly, the addition of the products used in accordance with the invention leads to economic and commercial improvements in the acid polishing of glass and also to a better quality. In addition to the actual etching and polishing bath, one of the wetting agents described above is also best added to the washing baths so that the washing solution drains off better, spot formation is avoided and entrainment losses are reduced.

The effect of adding these soluble wettings agents resistant to hydrogen fluoride, especially the fluorine-containing surfactants, to the mat etching baths for glass is that both the evaporation losses of HF and also the etching times and reaction temperatures are reduced. In addition, the surfaces are more uniformly wetted, largely irrespective of the composition of the glass.

Accordingly, the addition of the products used in accordance with the invention leads to economic and commercial improvements in the production of glass articles by mat glass etching.

Thus, the addition of the products used in accordance with the invention leads to economic and commercial improvements in the etching of glass articles, especially in the mat etching of plate glass and in the acid polishing of lead crystal glasses.

The invention is illustrated by the following Examples (in which all percentages are by weight):

EXAMPLE 1

Pressed crystal glass is acid-polished in an automatic acid-polishing installation consisting of an acid polishing bath, containing sulfuric acid and hydrofluoric acid (60% of $H_2SO_4$, 10–15% of HF, balance water), a sulfuric acid bath for rinsing off the etching sludge, and a water-rinsing bath. The working temperature of the acid polishing bath is 50°–60° C. The tanks have a volume of 1000 liters and are provided with an effective extraction system. The pressed glass articles to be polished are tightly packed into baskets, introduced into the acid polishing bath and automatically moved therein. They are then introduced into the sulfuric acid bath to rinse off the etching sludge. Finally, they are rinsed in the water bath. Rejects among the pressed lead crystal glass articles are caused mainly by residues of acid adhering persistently to the surface of the glass where it is in contact with the basket which gives rise to faults in the finish. If 100 mg/l of tetraethyl ammonium perfluoroctane sulfonate, in the form of a 5% aqueous solution, is added to the acid polishing bath (= 2 liters of 5% solution for 1000 liters of polishing acid) under otherwise the same working conditions, the points of contact are less noticeable and a better luster is obtained. Similar results are obtained by using tetramethyl ammonium perfluoroctane sulfonate or free perfluoroctane sulfonic acid as the fluorine-containing surfactant.

EXAMPLE 2

In an automatic acid polishing installation of the type described in Example 1, 200 mg/l of tetraethyl ammonium perfluoroctane sulfonate in the form of a 5% aqueous solution are added to the acid polishing bath (= 4 liters of 5% aqueous solution for 1000 liters of polishing acid), and mouth-blown, hand-ground lead crystal glasses and lead crystal flash (colored glasses) are acid-polished. The evolution of gas from the acid polishing bath comes virtually to a standstill after addition of the fluorine-containing wetting agent. No foaming occurs on the surface of the polishing bath. By comparison with the acid polishing bath without the fluorine-containing wetting agent added, the dip times are shortened by 20 to 30%, in addition to which the temperature in the acid polishing bath can be reduced to 40°–45° C. There is no evidence in any case of overetching of the crystal glasses. On the contrary, the lead crystal glasses acid-polished in the presence of fluorine-containing wetting agents are distinguished by particularly high luster and surface finish.

Similar results are obtained by adding an alkoxylated perfluoralkane sulfonamide of the formula:

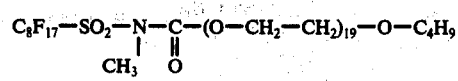

in a quantity of 50 mg/l to the acid polishing bath instead of the quarternized ammonium sulfonate.

EXAMPLE 3 (Comparison Example)

Plate glass is continuously mat-etched in an automatic mat etching installation, consisting of a pretreatment unit, an etching unit, a washing unit and a drying unit. In the pretreatment unit, the surface of the glass is cleaned and treated with a soap solution so that the glass is made wettable for the subsequent etching process. The glass thus pretreated is then mat-etched with 50% HF by finely spraying this etching liquid onto the surface of the glass. These etched articles then have to be thoroughly washed with water until free from acid and dried. The entire operation lasts 5 minutes, the process having to be repeated in view of inadequate etching at various places.

EXAMPLE 4

Mat etching is carried out in the same way as in Example 1, the only difference being that $C_8F_{17}SO_3N(C_2H_5)_4$ is added to the 50% HF as a fluorine-containing surfactant in a concentration of about 150 mg/liter. The pretreatment step is made superfluous by the addition of this surfactant, in addition to which the etching operation as a whole can be shortened to 3 minutes. Purification of the gases given off by evaporating hydrogen fluoride is easier because, overall, the evaporation losses are smaller.

EXAMPLE 5

Mat etching is carried out in the same way as in Example 1, except that the pretreatment stage is left out and $C_7F_{15}COONH_4$ added to the 70% HF as a fluorine-containing surfactant in a concentration of 300 mg/liter. The etching process lasts 3.5 minutes and no faults are observed.

EXAMPLE 6

Mat etching is carried out in the same way as in Example 1, but without the pretreatment stage. The hydrofluoric acid, which contains 5% of ammonium bifluoride and 100 mg of $C_8F_{17}SO_3N(C_2H_5)_4$ per liter, is sprayed finely onto the glass surface to be etched in a concentration of 70%, followed by brief rinsing and drying. Satisfactory, mat-etched glasses are again obtained.

EXAMPLE 7

The test is carried out in the same way as in Example 1, but without the pretreatment step, using 65% hydrofluoric acid which additionally contains 50 mg of a non-ionic fluorine-containing surfactant of the formula:

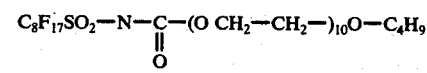

per liter of etching liquid. The mat etching process lasted 3 minutes and no faults were observed.

It will be appreciated that the instant specification and examples are set forth by way of illustration and not limitation, and that various modifications and changes may be made without departing from the spirit and scope of the present invention.

What we claim is:

1. In the etching of glass wherein glass is contacted with an aqueous etching bath containing hydrofluoric acid, and the glass is thereafter removed from the bath and rinsed, the improvement which comprises dissolving in the etching bath an acid-resistant quaternary ammonium perfluoroalkane sulfonate wetting agent of the formula $R_FSO_3^- NR^1R^2R^3R^{4+}$, wherein $R_F$ is a linear or branched aliphatic perfluoroalkyl radical with from 6 to 12 carbon atoms, and $R^1$, $R^2$, $R^3$ and $R^4$ each independently is an alkyl or aralkyl radical of up to 18 carbon atoms, or two or three of $R^1$, $R^2$ and $R^3$ are attached to form a ring through the nitrogen atom.

2. A process as claimed in claim 1, wherein the wetting agent is present in about 5 to 1000 mg/liter.

3. An etching solution for treating glass, comprising water, hydrofluoric acid and an acid-resistant quaternary ammonium perfluoroalkane sulfonate wetting agent of the formula $R_FSO_3^- NR^1R^2R^3R^{4+}$, wherein $R_F$ is a linear or branched aliphatic perfluoralkyl radical with from 6 to 12 carbon atoms, and $R^1$, $R^2$, $R^3$ and $R^4$ each independently is an alkyl or aralkyl radical of up to 18 carbon atoms, or two or three of $R^1$, $R^2$ and $R^3$ are attached to form a ring through the nitrogen atom.

* * * * *